US 12,047,870 B2

(12) United States Patent
Ma et al.

(10) Patent No.: US 12,047,870 B2
(45) Date of Patent: Jul. 23, 2024

(54) ACCESS CONTROL METHOD, BASE STATION AND TERMINAL

(71) Applicant: VIVO MOBILE COMMUNICATION CO., LTD., Chang'an Dongguan (CN)

(72) Inventors: Yue Ma, Chang'an Dongguan (CN); Xiaodong Yang, Chang'an Dongguan (CN); Yumin Wu, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/473,356

(22) Filed: Sep. 13, 2021

(65) Prior Publication Data

US 2021/0410054 A1    Dec. 30, 2021

Related U.S. Application Data

(63) Continuation of application No. 16/622,472, filed as application No. PCT/CN2018/090601 on Jun. 11, 2018, now Pat. No. 11,160,010.

(30) Foreign Application Priority Data

Jun. 15, 2017    (CN) .......................... 201710454750.X

(51) Int. Cl.
*H04W 48/16* (2009.01)
*H04W 8/24* (2009.01)
(Continued)

(52) U.S. Cl.
CPC ............. *H04W 48/16* (2013.01); *H04W 8/24* (2013.01); *H04W 36/0061* (2013.01);
(Continued)

(58) Field of Classification Search
CPC ... H04W 8/24; H04W 48/16; H04W 36/0061; H04W 48/02; H04W 68/005; H04W 76/11; H04W 84/042
See application file for complete search history.

(56) References Cited

U.S. PATENT DOCUMENTS

2008/0267153 A1    10/2008    Mukherjee et al.
2013/0324118 A1    12/2013    Iwamura et al.
(Continued)

FOREIGN PATENT DOCUMENTS

CN        101052206 A    10/2007
CN        101321372 A    12/2008
(Continued)

OTHER PUBLICATIONS

International Search Report & Written Opinion related to Application No. PCT/CN2018/090601; reported on Sep. 4, 2018.
(Continued)

*Primary Examiner* — Diane D Mizrahi
(74) *Attorney, Agent, or Firm* — von Briesen & Roper, s.c.

(57) ABSTRACT

An access control method, a base station and a terminal are provided. The method comprises: receiving a system message transmitted by a base station; determining whether to camp on a cell of the base station according to the system message to obtain a determination result; and performing, according to the determination result, a procedure of camping on the cell of the base station or a procedure of not camping on the cell of the base station.

9 Claims, 8 Drawing Sheets

(51) Int. Cl.
   *H04W 36/00*  (2009.01)
   *H04W 48/02*  (2009.01)
   *H04W 68/00*  (2009.01)
   *H04W 76/11*  (2018.01)
   *H04W 84/04*  (2009.01)

(52) U.S. Cl.
   CPC ......... *H04W 48/02* (2013.01); *H04W 68/005* (2013.01); *H04W 76/11* (2018.02); *H04W 84/042* (2013.01)

(56) References Cited

U.S. PATENT DOCUMENTS

| | | | |
|---|---|---|---|
| 2015/0094058 | A1 | 4/2015 | Dang et al. |
| 2016/0219475 | A1* | 7/2016 | Kim .................... H04W 76/15 |
| 2016/0277982 | A1 | 9/2016 | Jung et al. |
| 2018/0092018 | A1 | 3/2018 | Jung et al. |
| 2018/0234894 | A1 | 8/2018 | Jiang |

FOREIGN PATENT DOCUMENTS

| | | |
|---|---|---|
| CN | 101646223 A | 2/2010 |
| CN | 103096416 A | 5/2013 |
| CN | 103200571 A | 7/2013 |
| CN | 103385024 A | 11/2013 |
| CN | 105338584 A | 2/2016 |
| CN | 106413018 A | 2/2017 |
| CN | 106658758 A | 5/2017 |
| WO | 2009155967 A1 | 12/2009 |

OTHER PUBLICATIONS

First Chinese Office Action for related Application No. 201710454750.X; reported on Nov. 27, 2019.

Extended European Search Report related to Application No. 18817088.0; reported on Oct. 19, 2020.

Chinese Search Reported related to Application No. 201710454750.X; reported on Apr. 17, 2019.

Third Chinese Office Action for related Application No. 201710454750.X; reported on Jun. 12, 2020.

Partial Supplementary European Search Report related to Application No. 18817088.0; reported on Jun. 2, 2020.

Non Final Office Action related to U.S. Appl. No. 16/622,472; reported on Apr. 1, 2021.

Huawei et al.; "Network selection for initial access in ELTE network", 3GPP TSG-RAN WG2 #97, Athens, Greece, Feb. 13-17, 2017; R2-1701853.

Vivo; "General Aspects on LTE connected to 5GCN", 3GPP TSG-RAN WG2 #99, Berlin, Germany, Aug. 21-25, 2017; R2-1708435.

Qualcomm Incorporated, et al.; "Solution for interworking and migration", SA WG2 Meeting #116, Jul. 11-15, 2016, Vienna, AT, S2-164246.

Qualcomm Incorporated; "Updates on interworking and migration solution 18.2", SA WG2 Meeting #116bis, Aug. 29-Sep. 2, 2016, Sanya, P.R. China, S2-164641.

Nokia; "Solution to KI 17: PLMN+RAT discovery and selection", SA WG2 Meeting #117, Oct. 17-21, Kaohsiung, Taiwan, S2-165870.

LG Electronics; "Update of solution 18.3: Solutions for migration from E-UTRAN/EPC including option 3 to option 2,4,5, or 7", SA WG2 Meeting #118, Nov. 14-18, 2016, Reno, Nevada, USA, S2-166555.

RAN WG2; "LS on LTE connectivity to 5G-CN", SA WG2 Meeting #S2-122, Jun. 26-30, 2017, San Jose Del Cabo, Mexico, S2-174115.

3rd Generation Partnership Project; Technical Specification Group Services and System Aspects; Study on Architecture for Next Generation System, (Release 14), 3GPP TR 23.799 V14.0.0 (Dec. 2016).

* cited by examiner

ACCESS CONTROL METHOD, BASE STATION AND TERMINAL

CROSS-REFERENCE TO RELATED APPLICATION

This application is a continuation application of U.S. patent application Ser. No. 16/622,472 filed on Dec. 13, 2019, which is the U.S. national phase of PCT Application No. PCT/CN2018/090601 filed on Jun. 11, 2018, and claims a priority to the Chinese patent application No. 201710454750.X filed in China on Jun. 15, 2017. All of these disclosures are incorporated herein by reference in their entireties.

TECHNICAL FIELD

The present disclosure relates to the field of communication technologies, in particular to an access control method, a base station and a terminal.

BACKGROUND

For the future $5^{th}$ Generation (5G) mobile communication systems, the $3^{rd}$ Generation Partnership Project (3GPP) RAN mainly defines two evolution directions of the 5G systems, including evolved Long Term Evolution (eLTE) and 5G New Radio (NR).

The eLTE refers to air interface LTE accessing to 5G core network (may be referred to as NGC after 15R15 version). The eLTE project has been successfully established at the RAN #75 conference (RP-170840) and has been discussed at the RAN2 #98 conference. There are various deployment possibilities for eLTE, such as eLTE connecting to an Evolved Packet Core network (EPC) and a Next Generation Core network (NGC), or the eLTE only connecting to the NGC. When the eLTE is only connected to the NGC, it means that a terminal that attempts to access the network must support the 5G non-access stratum (NAS), otherwise it cannot access the network.

When the eLTE is only connected to the NGC (R15), there are still many R14 terminals in the operator's network. This type of terminal cannot access the R15 eLTE network, due to a lack of the NGC NAS function. However, since a system design of the LTE is adopted by the air interface, this type of terminal can still attempt to camp on the network through a cell selection or cell reselection procedure until it is rejected by the core network after the core network finds the terminal illegal.

The related art cannot directly cause the terminal not to attempt to camp on the cell, which may cause the terminal to frequently attempt to camp on the cell and consume power.

SUMMARY

In a first aspect, an access control method is provided according to embodiments of the present disclosure, which is applied to a terminal. The method includes:
  receiving a system message transmitted by a base station;
  determining whether to camp on a cell of the base station according to the system message to obtain a determination result; and
  performing, according to the determination result, a procedure of camping on the cell of the base station or a procedure of not camping on the cell of the base station.

In a second aspect, an access control method is further provided according to embodiments of the present disclosure, which is applied to a base station, and includes: transmitting a system message to a terminal, to enable the terminal to determine whether the terminal is permitted to camp on a cell of the base station according to the system message to obtain a determination result, and enable the terminal, according to the determination result, to camp on the cell of the base station or not to camp on the cell of the base station.

In a third aspect, a terminal is further provided according to embodiments of the present disclosure, which includes:
  a first receipt module, configured to receive a system message transmitted by a base station;
  a determination module, configured to determine whether to camp on a cell of the base station according to the system message to obtain a determination result; and
  a control module, configured to perform, according to the determination result, a procedure of camping on the cell of the base station or a procedure of not camping on the cell of the base station.

In a fourth aspect, a base station is further provided according to embodiments of the present disclosure, which includes: a first transmission module configured to transmit a system message to a terminal, to enable the terminal to determine whether the terminal is permitted to camp on a cell of the base station according to the system message to obtain a determination result, and enable the terminal, according to the determination result, to camp on the cell of the base station or not to camp on the cell of the base station.

In a fifth aspect, a terminal is further provided according to embodiments of the present disclosure, which includes: a memory, a processor, and a computer program stored on the memory and executable on the processor. When executing the program, the processor is configured to implement steps of the access control method described above in the first aspect.

In a sixth aspect, a base station is further provided according to embodiments of the present disclosure, which includes: a memory, a processor, and a computer program stored on the memory and executable on the processor. When executing the program, the processor is configured to implement steps of the access control method described above in the second aspect.

In a seventh aspect, a computer readable storage medium is further provided according to embodiments of the present disclosure, having stored thereon a data transfer program, and the data transfer program is executed by a processor to implement steps in the access control method as described above.

An access control method, a base station, and a terminal are provided according to the embodiments of the present disclosure, which include determining whether the terminal needs to camp on a cell of the base station by determining whether the terminal is capable of identifying certain information in a system message from the base station (such as a certain field in the system message). In a case that the terminal is capable of identifying the information, it indicates that the terminal has a capability required by a serving cell of the base station, and when the terminal camps on the cell of the base station, the terminal can successfully access the cell of the base station. In a case that the terminal is incapable of identifying the information, it indicates that the terminal does not have the capability required by the serving cell of the base station, or that the base station does not have a capability to provide a service required by the terminal, when the terminal attempts to camp on the cell of the base station, a network side may reject a request of the terminal, and in this case, the terminal can directly abandon camping on the cell of the base station.

BRIEF DESCRIPTION OF THE DRAWINGS

Various other advantages and benefits will become apparent to a person of ordinary skill in the art by reading detailed descriptions of optional embodiments hereinafter. Drawings are only for the purpose of illustrating preferred embodiments and are not construed as limiting the present disclosure. Throughout the drawings, a same component is denoted by a same reference sign.

DETAILED DESCRIPTION

In order to make objectives, technical solutions and advantages of the present disclosure clearer, the technical solutions of embodiments of the present disclosure will be clearly and completely described below in conjunction with drawings of the embodiments of the present disclosure. It is obvious that the described embodiments are only a part of the embodiments of the present disclosure, but not all of the embodiments of the present disclosure. All other embodiments obtained by a person of ordinary skill in the art without creative effort based on the embodiments of the present disclosure shall fall within the protection scope of the present disclosure.

Terms "include" and "have" and any variant thereof in the specification and claims of the present disclosure are intended to cover nonexclusive inclusions. For example, a process, a method, a system, a product or equipment including a series of steps or units is not limited to those steps or units which are clearly listed, but may include other steps or units which are not clearly listed or intrinsic to the process, the method, the product or the equipment.

In the embodiments, a base station may be a global system of mobile communication (GSM) or code division multiple access (CDMA) base transceiver station (BTS), or a wideband code division multiple access (WCDMA) NodeB (NB), or a LTE evolutional Node B (eNB or eNodeB), or New radio access technical (New RAT or NR) base station, a relay station or access point, or a future 5G network base station, etc., which is not limited herein.

In this embodiment, the terminal may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called "cellular" cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

Figure 1:
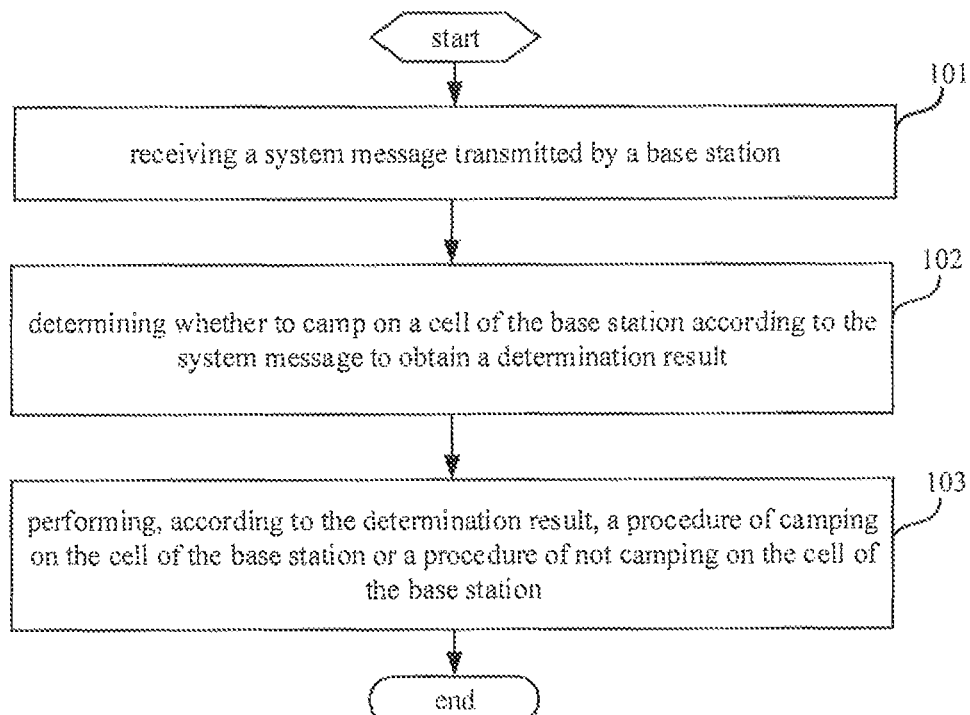
FIG. 1 is a flowchart of an access control method according to an embodiment of the present disclosure.

Reference is made to FIG. 1, which shows a flowchart of an access control method according to an embodiment. An execution body of the method is a terminal, and the method includes steps 101 to 103.

Step 101: receiving a system message transmitted by a base station.

Optionally, the system message may include any one of the following: a first field (e.g., a critical extension field), access class barring, a PLMN identifier of a PLMN corresponding to a current core network of a cell of the base station, a type of a core network supported by the cell of the base station, a second field, a third field, or a fourth field.

A role of the first field includes that the terminal determines whether the terminal has the function required by the cell of the base station, according to whether the terminal can identify the first field.

A role of the access class barring includes that the terminal determines whether it belongs to a class barred by the cell of the base station according to the access class barring.

A role of the PLMN identifier of the PLMN corresponding to the current core network of the cell of the base station includes that the terminal determines whether it has registered in a PLMN network corresponding to the PLMN identifier, according to the PLMN identifier.

A role of the core network type supported by the cell of the base station includes that the terminal determines whether it has a capability required by the core network corresponding to the core network type, according to the core network type supported by the cell of the base station.

A role of the second field includes that the terminal determines whether it needs to camp on the cell of the base station according to a value of the second field.

The third field is used to indicate a correspondence between restricted access conditions of cells and service requirements.

The fourth field is used to indicate a correspondence between types of cells and restricted access conditions of cells.

Step 102: determining whether to camp on a cell of the base station according to the system message to obtain a determination result.

The cell of the base station described above may be: a serving cell of the base station or a neighboring cell of the serving cell of the base station.

It should be noted that the camping in the embodiment has two meanings, one of the meanings is the usual meaning of camping, which includes that the terminal needs to transmit an access request to the base station when the terminal in a connected mode wants to camp on the cell of the base station; and the other meaning lies in attempting to camp. The attempting to camp refers to that the terminal does not need to transmit an access request to the base station, and the terminal only needs to read the system message transmitted by the base station in order to complete the camping, for example, the terminal in an idle mode only reads the system message transmitted by the base station, for a purpose of camping on the base station. Step 103 includes: performing, according to the determination result, a procedure of camping on the cell of the base station or a procedure of not camping on the cell of the base station.

It should be noted that the procedure of camping on the cell of the base station may be performed according to an existing processing manner, and is not described herein.

It should be noted that when the terminal does not perform the procedure of camping on the cell of the base station, the terminal may keep a current state unchanged, or perform other existing processes, which are not described herein.

In this embodiment, whether a terminal requires to camp on a cell of the base station can be determined by determining whether the terminal is capable of identifying certain information in a system message from the base station (such as a certain field in the system message). In a case that the terminal is capable of identifying the information, it indicates that the terminal has a capability required by a serving cell of the base station, and when the terminal camps on the cell of the base station, the terminal is able to successfully access the cell of the base station. In a case that the terminal is incapable of identifying the information, it indicates that the terminal does not have the capability required by the serving cell of the base station, and when the terminal attempts to camp on the cell of the base station, a network side will reject a request of the terminal. In this case, the terminal can directly abandon camping on the cell of the base station, thereby avoiding a high power consumption caused by frequent access of the terminal.

For example, in a scenario where the eLTE is only connected to the NGC, in a case that the terminal supports the NGC NAS capability in the eLTE version R15, the terminal determines that the cell of the base station is capable of being camped on by the terminal, after receiving the system message transmitted by the base station. In a case that the terminal is a terminal supporting the LTE version R14/R14−, the terminal determines that the cell of the base station does not need to be camped on by the terminal, after receiving the system message transmitted by the base station, thereby reducing consumption of network resources, and causing terminals supporting the LTE version R14/R14− to save power.

Similarly, for 5G NR R15 terminals, after certain features are introduced into the LTE version R16, such as Closed Subscriber Group (CSG), a CSG cell do not allow users with an identifier other than a CSG identifier to access it. In a design of the eLTE version R15, a terminal supporting the eLTE version R15 may make no attempt to access the CSG cell in a network supporting the eLTE version R16, based on a terminal behavior and based on a determination from the system message, thereby saving network resources and reducing power consumption of terminals.

Figure 2:
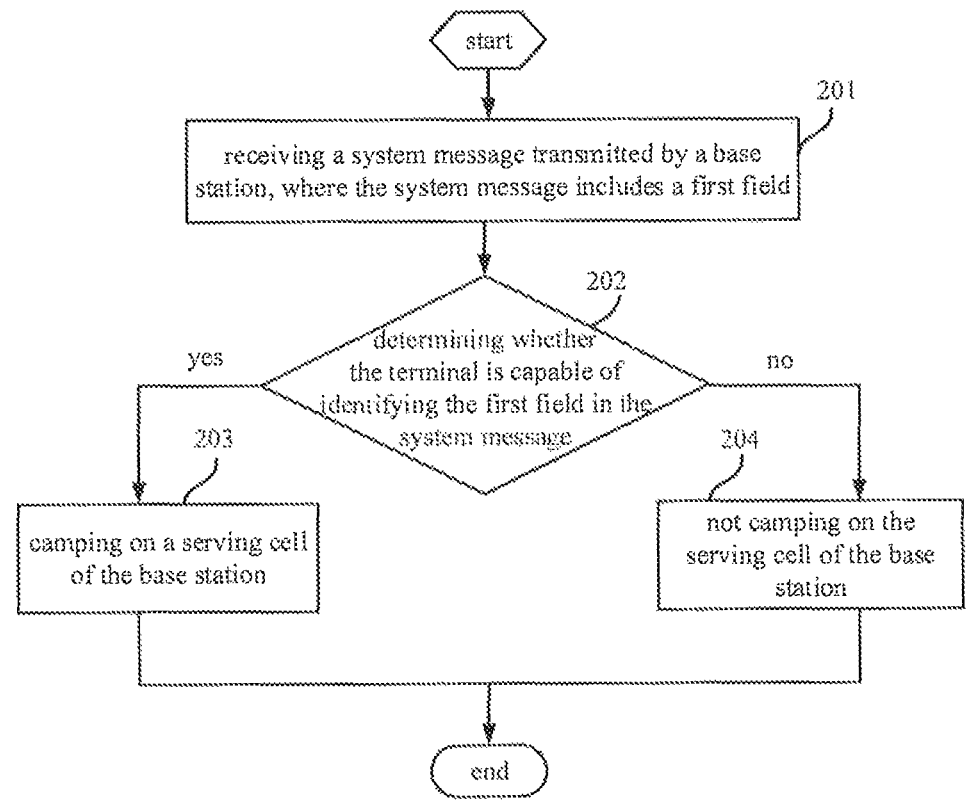
FIG. 2 is a flowchart of an access control method according to another embodiment of the present disclosure.

Reference is made to FIG. 2, which shows a flowchart of an access control method according to another embodiment. An execution body of the method is a terminal, and the method includes steps 201 to 204.

Step 201: receiving a system message transmitted by a base station, where the system message includes a first field.

The system message may be a broadcast control channel (BCCH) message, and the first field may be a critical extension field in the BCCH message. A terminal supporting the LTE version R14/R14− has a capability of identifying system information (systemInformation) or a related field of a system information block (systemInformationBlockType1, SIB1).

In a design of the eLTE version R15, a reserved critical extension field is adjusted, so as to cause the adjusted critical extension field to be only capable of being identified by terminals supporting the NGC NAS capability in the eLTE version R15, which cannot be identified by terminals supporting the LTE version R14/R14−.

Step 202: determining whether the terminal is capable of identifying the first field in the system message; when the terminal is capable of identifying the first field, obtaining the determination result that the procedure of camping on the cell of the base station is allowed to be performed, and proceeding to step 203; and when the terminal is incapable of identifying the first field, obtaining the determination result that the procedure of camping on the cell of the base station is not allowed to be performed, and proceeding to step 204.

Step 203: camping on a serving cell of the base station.

Step 204: not camping on the serving cell of the base station.

In this embodiment, if the terminal is capable of identifying the first field, it indicates that the terminal has a capability required by the cell of the base station, the determination result is to perform the procedure of camping on the cell of the base station; and if the terminal is incapable of identifying the first field, it indicates that the terminal does not have the capability required by the cell of the base station, the determination result is not to perform the procedure of camping on the cell of the base station.

For example, when receiving a system message transmitted by a base station supporting the eLTE version R15, a terminal supporting the LTE version R14/R14− is incapable of identifying related information in the system message, which is considered as that the terminal supporting the LTE version R14/R14− fails to read the system message, and may make no attempt to camp on the serving cell of the base station. Meanwhile, a corresponding terminal supporting the eLTE version R15 is capable of identifying the related information in the system message, and may not be restricted to access, thus the terminals supporting the eLTE version R15 can attempt to camp on the cell of the base station.

It should be noted that the above embodiment is not limited to modifying the critical extension field, and other critical extension fields in the protocol that can affect user access should not be excluded.

Figure 3:
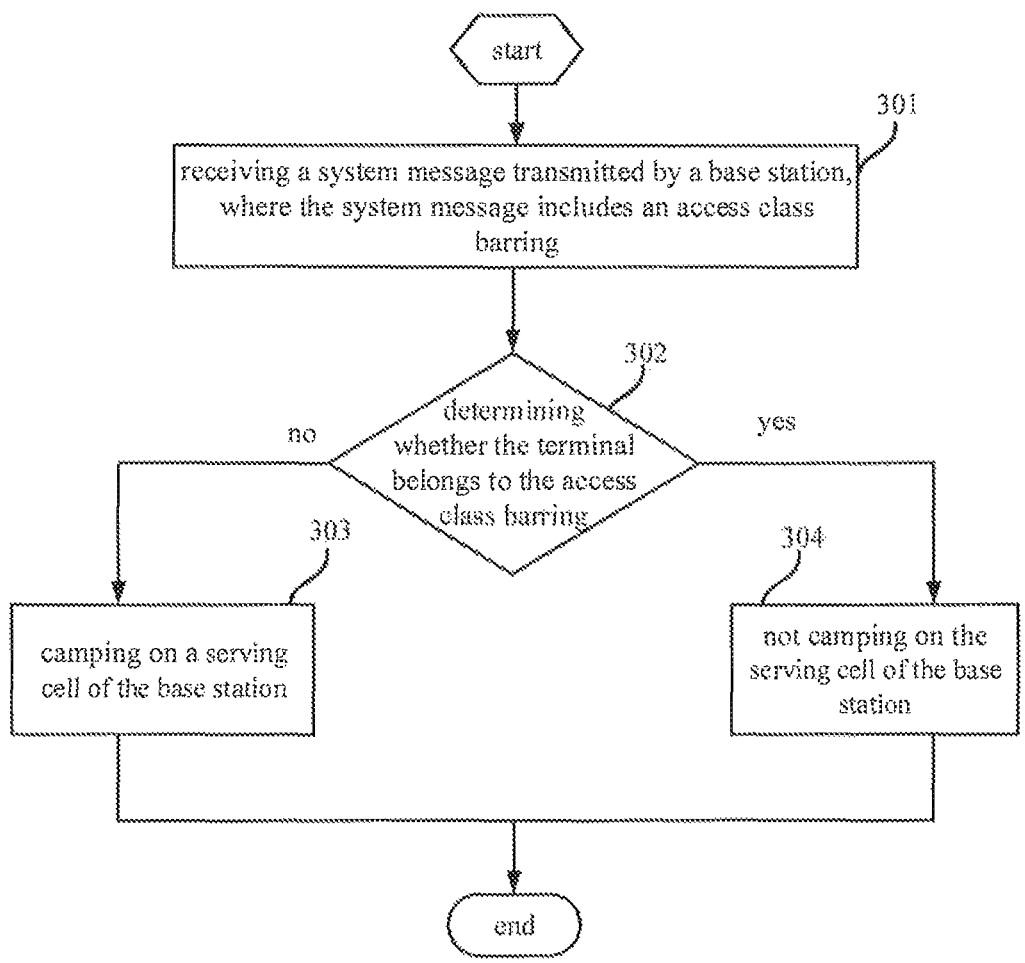
FIG. 3 is a flowchart of an access control method according to another embodiment of the present disclosure.
Figure 4:
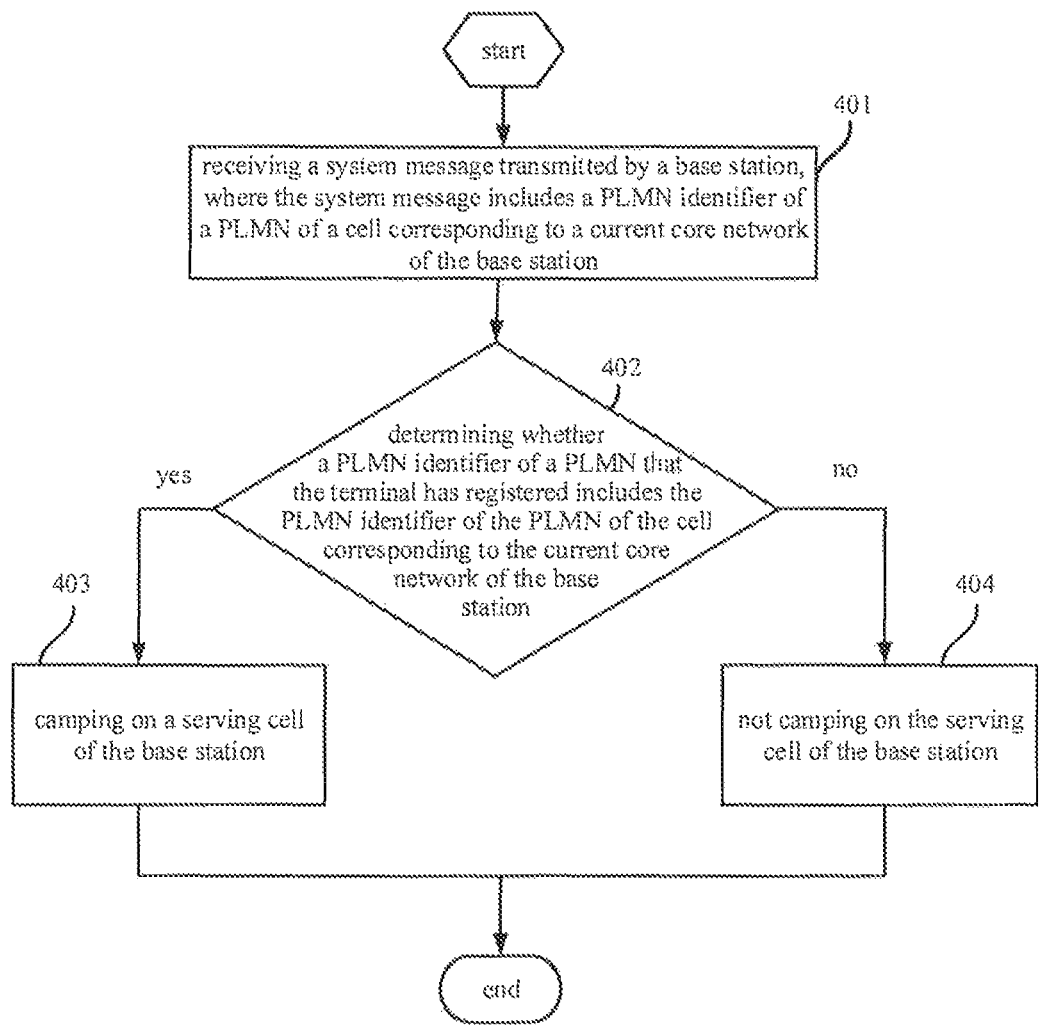
FIG. 4 is a flowchart of an access control method according to another embodiment of the present disclosure.

Reference is made to FIG. 3, which shows a flowchart of an access control method according to another embodiment. An execution body of the method is a terminal, and the method includes steps 301 to 304.

Step 301: receiving a system message transmitted by a base station, where the system message includes an access class barring.

Access class barring is referred to as ACB.

Step 302: determining whether the terminal belongs to the access class barring; when the terminal does not belong to the access class barring, obtaining the determination result that the procedure of camping on the cell of the base station is allowed to be performed, and proceeding to step 303; and when the terminal belongs to the access class barring, obtaining the determination result that the procedure of camping on the cell of the base station is not allowed to be performed, and proceeding to step 304.

Step 303: camping on the cell of the base station.

Step 304: not camping on the cell of the base station.

For example, the LTE eNB (base station) broadcasts an access class that needs to be restricted to access in System Message 2 (SIB2); and the terminal checks whether it belongs to the restricted class, and if it belongs to the restricted class, the terminal does not perform the camping.

Since terminals supporting the LTE version R14/R14- cannot identify configurations of any eNB supporting the eLTE version R15, an implementation method is to take all classes of all the legacy terminals (legal terminals) as access class barring.

Reference is made to FIG. 3, which shows a flowchart of an access control method according to another embodiment. The method is performed by a terminal, and includes steps 401 to 404.

Step 401: receiving a system message transmitted by a base station, where the system message includes a PLMN identifier of a PLMN of a cell corresponding to a current core network of the base station.

The current core network may be an NGC core network newly created by the operator, and the eLTE only connects to the NGC core network.

Step 402: determining whether a PLMN identifier of a PLMN that the terminal has registered includes the PLMN identifier of the PLMN of the cell corresponding to the current core network of the base station; when the PLMN identifier of the PLMN that the terminal has registered includes the PLMN identifier of the PLMN of the cell corresponding to the current core network of the base station, the determination result being that the procedure of camping on the cell of the base station is allowed to be performed, and proceeding to step 403; and when the PLMN identifier of the PLMN that the terminal has registered does not include the PLMN identifier of the PLMN of the cell corresponding to the current core network of the base station, the determination result being that a procedure of camping on the cell of the base station is not allowed to be performed, and proceeding to step 404.

Step 403: camping on the cell corresponding to the current core network of the base station.

Step 404: not camping on the cell corresponding to the current core network of the base station.

For example, a terminal supporting the LTE version R14/R14- uses a PLMN identifier of an original Evolved Packet Core network (EPC) of the operator, in a case that the operator creates a new Next Generation Core network (NGC), and the eLTE only connects to the NGC core network. In order to prevent the terminal supporting the LTE version R14/R14- from camping on the NGC, the NGC is configured with a new PLMN identifier, and the terminal supporting the LTE version R14/R14- only has the PLMN identifier of the EPC, and may not camp on the cell corresponding to the NGC core network.

In another embodiment of the present disclosure, on the basis of flows of the access control method shown in FIG. 1, FIG. 2, FIG. 3 or FIG. 4, when the terminal fails to access the serving cell of the base station, the method further includes: receiving a first notification message transmitted by the base station, where the first notification message carries information related to a redirected cell.

A terminal supporting the LTE version R14/R14- attempts to access an eLTE-NGC-only cell supporting the eLTE version R15, and the access shall fail, since the terminal only has the EPC NAS function. When a network side knows that the terminal capability does not include the 5G NAS, or the network side finds a capability mismatch through the core network, the network side transmits a release message or a reject message to the terminal via the base station, and the message includes information about the redirected cell used to indicate the terminal to camp on other feasible candidate cells.

Figure 5:
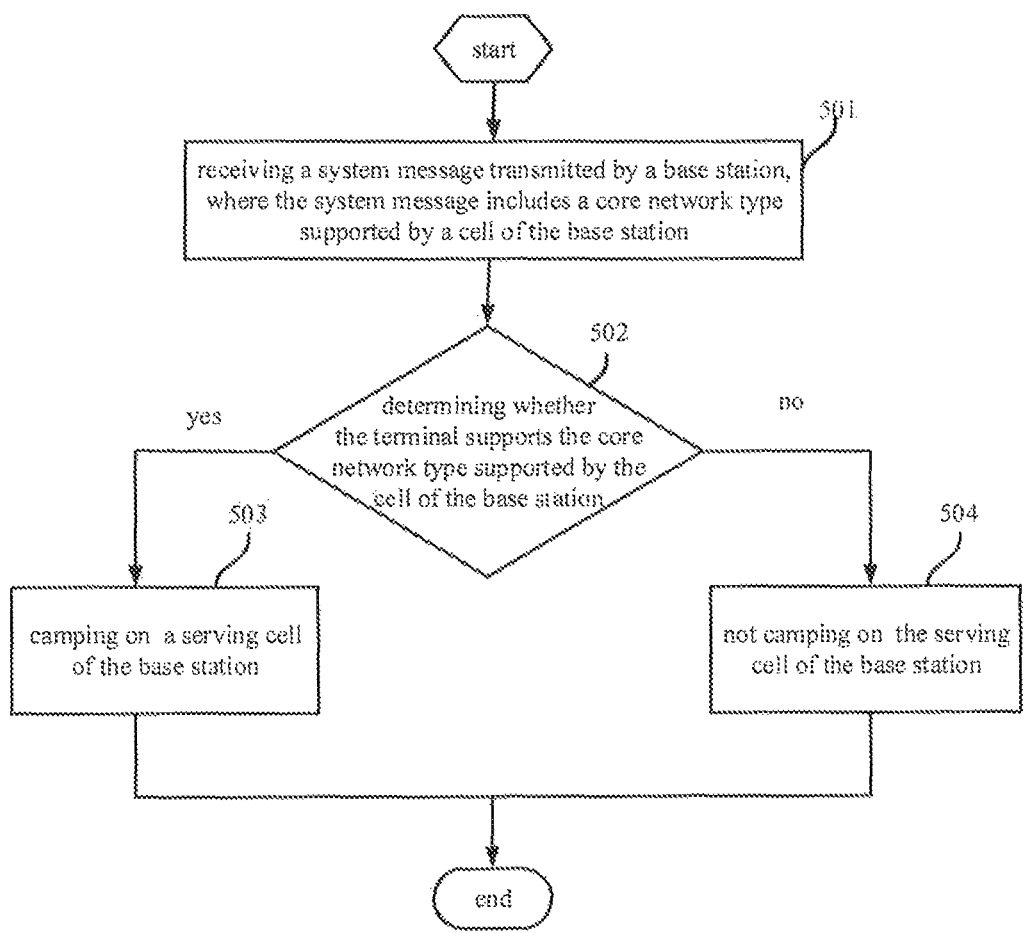
FIG. 5 is a flowchart of an access control method according to another embodiment of the present disclosure.

Reference is made to FIG. 5, which shows a flowchart of an access control method according to another embodiment. An execution body of the method is a terminal, and the method includes steps 501 to 504.

Step 501: receiving a system message transmitted by a base station, where the system message includes a core network type supported by a cell of the base station.

In this embodiment, the core network type supported by the cell of the base station may be EPC, NGC, or both EPC and NGC, and of course, is not limited thereto.

Step 502: determining whether the terminal supports the core network type supported by the cell of the base station; when the terminal supports the core network type supported by the cell of the base station, the determination result being that the procedure of camping on the cell of the base station is allowed to be performed, and proceeding to step 503; and when the terminal does not support the core network type supported by the cell of the base station, the determination result being that a procedure of camping on the cell of the base station is not allowed to be performed, and proceeding to step 504.

Step 503: camping on the cell of the base station.

Step 504: not camping on the cell of the base station.

For example, a terminal that supports the eLTE version R15 does not have the 5G NAS function, but the air interface supports the eLTE version R15 protocol. For this type of terminal, a new broadcast indication may be defined in the eLTE version R15 protocol, such as adding an SIBx message value used to indicate a cell supporting only EPC, or only NGC, or both EPC and NGC, to assist the terminal to determine whether the cell is suitable for camping. This indication may also be used as an assistance condition in cell selection and reselection.

Figure 6:
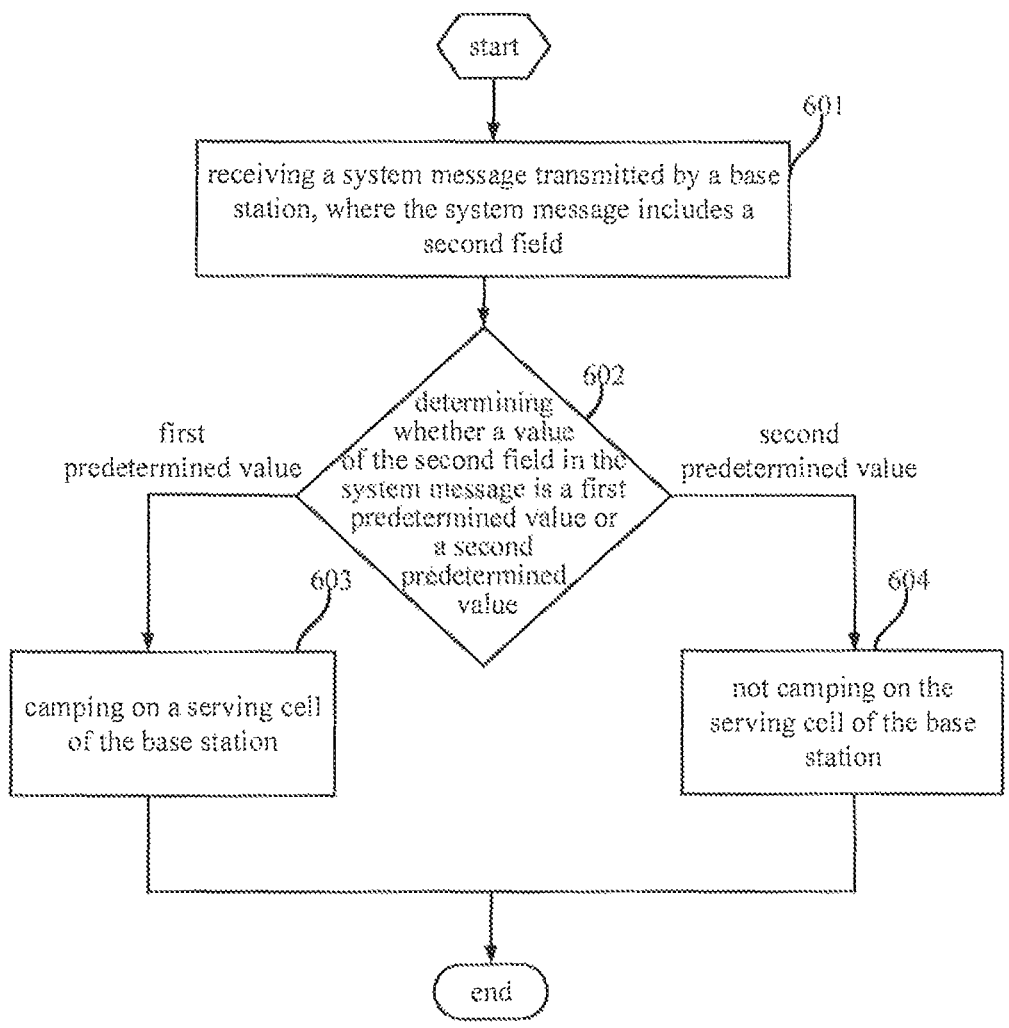
FIG. 6 is a flowchart of an access control method according to another embodiment of the present disclosure.

Reference is made to FIG. 6, which shows a flowchart of an access control method according to another embodiment. An execution body of the method is a terminal, and the method includes steps 601 to 604.

Step 601: receiving a system message transmitted by a base station, where the system message includes a second field.

Step 602: determining whether a value of the second field in the system message is a first predetermined value or a second predetermined value; if the value of the second field in the system message is the first predetermined value, obtaining the determination result that the procedure of camping on the cell of the base station is allowed to be performed, and going to step 603; and if the value of the second field in the system message is the second determined value, obtaining the determination result that the procedure of camping on the cell of the base station is not allowed to be performed, and going to step 604.

Step 603: camping on the cell of the base station.

Step 604: not camping on the cell of the base station.

In this embodiment, in the standard setting of the eLTE version R15, certain fields or other fields (such as a bit) in the broadcast message may be set in manner that when a value of the field is a value 0, the value 0 indicates that a terminal supporting the eLTE version R15 is identifiable, and normally access a cell, when the value of the field is a value 1, the value 1 indicates the cell has some possible features e (such as CSG) in the later version, and the cell is considered abnormal and not accessed.

It should be noted that the above descriptions are only as an example, and the terminal behavior is unnecessarily not to access the cell. If the corresponding feature is not the CSG, a subsequent behavior of the terminal may be identified by a flag.

In another embodiment of the present disclosure, on the basis of flows of the access control method shown in in FIG. 1, FIG. 2, FIG. 3, FIG. 4, FIG. 5 or FIG. 6, the method further includes: receiving a second notification message transmitted by the base station, where the second notification message includes information about whether a neighboring cell of a serving cell of the base station supports a first service. The second notification message may be transmitted through an inter-base station interface or a gateway device.

After a system message broadcasted by a cell includes information about whether a neighboring cell supports a certain service, the terminal reads the information, which can assist to determine whether other cells except the cell are suitable for camping, thereby further saving power consumption. Certainly, the cell may perform information exchange and transmission between base stations through interfaces such as X2, Xn, Xx, or a gateway, to obtain the information about whether the neighboring cell supports a certain service.

In another embodiment of the present disclosure, the system message includes a third field, where the third field includes a correspondence between a restricted access condition of a cell and a service requirement.

Optionally, the correspondence between the restricted access condition of the cell and the service requirement is indicated in a form of joint coding, or the correspondence between the restricted access condition of the cell and the service requirement is indicated in a form of a bitmap. The terminal can identify a combination of different classes of services.

In the standardization of the eLTE version R15, a certain field or the other field (such as two bits) of a broadcast message is set to combine restriction conditions and emergency call requirements of CSG cells, which includes, but not limited to, the following meanings:
  binary code 00 indicating that: a terminal supporting the eLTE version R15 does not require to be identified and normally accesses a CSG cell,
  binary code 01 indicating that: in the eLTE version R16, a CSG cell is restricted, and is incapable of making an emergency call;
  binary code 10 indicating that: in the eLTE version R16, a CSG cell is restricted, but is capable of making an emergency call; and
  binary code 11 indicating that: in the eLTE version R16, a CSG cell is not restricted to access, but is incapable of making an emergency call.

In addition, one bit may also be used to indicate the CSG cell, and services such as default emergency calls and earthquake warnings are defined.

It should be noted that the values of the fields shown above are only examples, and the fields are not specifically limited in the embodiments.

In another embodiment of the present disclosure, the system message includes a fourth field, where the fourth field includes a correspondence between a type of the cell and a restricted access condition of the cell.

Optionally, the correspondence between the type of the cell and the restricted access condition of the cell is indicated in a form of joint coding, or the correspondence between the type of the cell and the restricted access condition of the cell is indicated in a form of a bitmap. The terminal can identify a combination of different classes of services.

In the standard setting of the eLTE version R15, certain fields or other fields of the broadcast message are defined to jointly encode the CSG restriction and Standalone (SA) and Non-Standalone (NSA) identification, which includes, but not limited to, the following meanings:
  binary code 00 indicating that: an SA cell in the eLTE version R15 is indicated, the CSG does not need to be identified, and the normal access is performed;
  binary code 01 indicating that: an NSA cell in the eLTE version R15 is indicated, the CSG does not need to be identified, and the normal access is performed;
  binary code 10 indicating that: an SA cell is indicated in the eLTE version R16, and the CSG cell is restricted; and
  binary code 11 indicating that: an NSA cell is indicated in the eLTE version R16, and the CSG cell is restricted.

In addition, if there may be more combinations of services, a form of joint coding or bitmap may be used for indication.

It should be noted that the values of the fields as shown above are only as examples, and the fields are not specifically limited in this embodiment.

Figure 7:
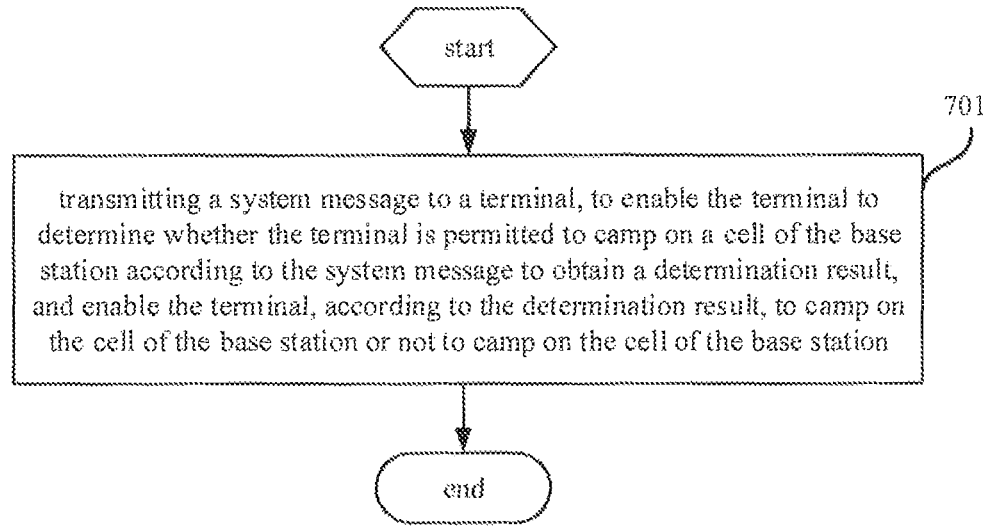
FIG. 7 is a flowchart of an access control method according to another embodiment of the present disclosure.

Reference is made to FIG. 7, which shows a flowchart of an access control method according to another embodiment. An execution body of the method is a base station, and specific steps of the method are as follows:
  step 701: transmitting a system message to a terminal, to enable the terminal to determine whether the terminal is permitted to camp on a cell of the base station according to the system message to obtain a determination result, and enable the terminal, according to the determination result, to camp on the cell of the base station or not to camp on the cell of the base station.

In another embodiment, optionally, the system message includes a first field; when the terminal is capable of identifying the first field, the determination result includes permitting the terminal to perform a procedure of camping on the cell of the base station; and when the terminal is incapable of identifying the first field, the determination result includes prohibiting the terminal to perform the procedure of camping on the cell of the base station.

In another embodiment, optionally, the system message includes the first field, and the system message includes an access class barring. When the terminal belongs to the access class barring, the determination result includes prohibiting the UE to perform a procedure of camping on the cell of the base station; and when the terminal does not belong to the access class barring, the determination result includes permitting the terminal to perform the procedure of camping on the cell of the base station.

In another embodiment, optionally, the system message includes a PLMN identifier of a PLMN of a cell corresponding to a current core network of the base station; when the PLMN identifier of the PLMN that the terminal has registered includes the PLMN identifier of the PLMN of the cell corresponding to the current core network of the base station, the determination result includes permitting the terminal to perform a procedure of camping on the cell of the base station; and when the PLMN identifier of the PLMN that the terminal has registered does not include the PLMN identifier of the PLMN of the cell corresponding to the current core network of the base station, the determination result includes prohibiting the terminal to perform the procedure of camping on the cell of the base station.

In another embodiment, optionally, the method further includes: transmitting a first notification message to the terminal, when the terminal fails to access a serving cell of the base station, and the first notification message carries information related to a redirected cell and/or information of a core network available to the terminal.

In another embodiment, optionally, the system message includes a core network type supported by a cell of the base station; when the terminal supports the core network type supported by the cell of the base station, the determination result includes permitting the terminal to perform a procedure of camping on the cell of the base station; and when the terminal does not support the core network type supported by the cell of the base station, the determination result includes prohibiting the terminal to perform the procedure of camping on the cell of the base station.

In another embodiment, optionally, the system message includes a second field; when a value of the second field in the system message is a first predetermined value, the determination result includes permitting the terminal to perform a procedure of camping on the cell of the base station; and when the value of the second field in the system message is a second predetermined value, the determination result includes prohibiting the terminal to perform the procedure of camping on the cell of the base station.

In another embodiment, optionally, the method further includes: transmitting a second notification message to the terminal, where the second notification message includes information about whether a neighboring cell of a serving cell of the base station supports a first service.

In another embodiment, optionally, the system message includes a third field, and the third field includes a correspondence between a restricted access condition of a cell and a service requirement. Optionally, the correspondence between the restricted access condition of the cell and the service requirement is indicated in a form of joint coding, or the correspondence between the restricted access condition of the cell and the service requirement is indicated in a form of a bitmap.

In another embodiment, optionally, the system message includes a fourth field, and the fourth field includes a correspondence between a type of the cell and a restricted access condition of the cell. Optionally, the correspondence between the type of the cell and the restricted access condition of the cell is indicated in a form of joint coding, or the correspondence between the type of the cell and the restricted access condition of the cell is indicated in a form of a bitmap.

Based on the same inventive concept, a terminal is further provided according to an embodiment of the present disclosure. Principles for the terminal to address issues are similar to those in the access control method in the embodiments of the present disclosure. Therefore, implementations of the terminal may refer to the implementations of the method, which are not repeated herein again.

Figure 8:
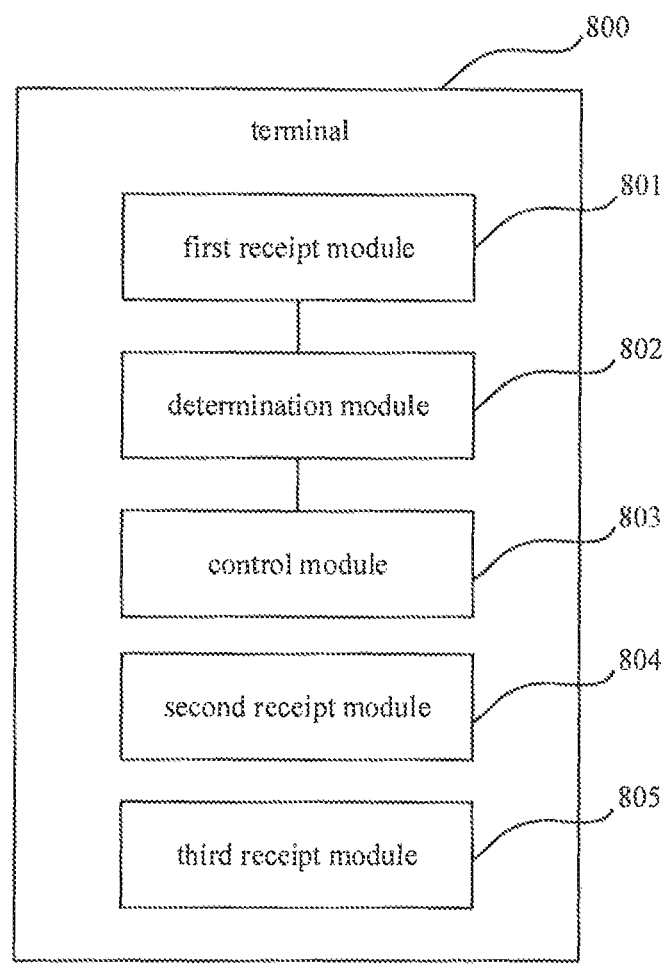
FIG. 8 is a schematic structural diagram of a terminal according to an embodiment of the present disclosure.

Reference is made to FIG. 8, which shows a structure of the terminal. The terminal 800 includes: a first receipt module 801 configured to receive a system message transmitted by a base station; a determination module 802 configured to determine whether to camp on a cell of the base station according to the system message to obtain a determination result; and a control module 803 configured to perform, according to the determination result, a procedure of camping on the cell of the base station or a procedure of not camping on the cell of the base station.

In an embodiment, optionally, the system message includes a first field, and the determination module 802 is further configured to:
  determine whether the terminal is capable of identifying the first field in the system message;
  obtain the determination result of permitting performing the procedure of camping on the cell of the base station, when the terminal is capable of identifying the first field; and
  obtain the determination result of prohibiting performing the procedure of camping on the cell of the base station, when the terminal is incapable of identifying the first field.

In an embodiment, optionally, the system message includes an access class barring, and the determination module 802 is further configured to:
  determine whether the terminal belongs to the access class barring;
  obtain the determination result of prohibiting performing the procedure of camping on the cell of the base station, when the terminal belongs to the access class barring; or
  obtain the determination result of permitting performing the procedure of camping on the cell of the base station, when the terminal does not belong to the access class barring.

In an embodiment, optionally, the system message includes a PLMN identifier of a PLMN of a cell corresponding to a current core network of the base station, and the determination module 802 is further configured to:
  determine whether a PLMN identifier of a PLMN that the terminal has registered includes the PLMN identifier of the PLMN of the cell corresponding to the current core network of the base station;
  obtain the determination result of permitting performing the procedure of camping on the cell of the base station, when the PLMN identifier of the PLMN that the terminal has registered includes the PLMN identifier of the PLMN of the cell corresponding to the current core network of the base station; or
  obtain the determination result of prohibiting performing the procedure of camping on the cell of the base station, when the PLMN identifier of the PLMN that the terminal has registered does not include the PLMN identifier of the PLMN of the cell corresponding to the current core network of the base station.

In an optional embodiment, referring to FIG. 8 again, the terminal 800 further includes: a second receipt module 804 configured to receive a first notification message transmitted by the base station when the terminal fails to access to a serving cell of the base station, where the first notification message carries information related to a redirected cell.

In an optional embodiment, the system message includes a core network type supported by a serving cell of the base station; and the determination module 802 is further configured to:
  determine whether the terminal supports the core network type supported by the cell of the base station;
  obtain the determination result of permitting performing the procedure of camping on the cell of the base station, when the terminal supports the core network type supported by the cell of the base station; or
  obtain the determination result of prohibiting performing the procedure of camping on the cell of the base station, when the terminal does not support the core network type supported by the cell of the base station.

In an optional embodiment, the system message includes a second field, and the determination module 802 is further configured to:
- determine whether a value of the second field in the system message is a first predetermined value or a second predetermined value;
- obtain the determination result of permitting performing the procedure of camping on the cell of the base station, when the value of the second field in the system message is the first predetermined value; or
- obtain the determination result of prohibiting performing the procedure of camping on the cell of the base station, when the value of the second field in the system message is the second predetermined value.

In an optional embodiment, referring to FIG. 8 again, the terminal 800 further includes: a third receipt module 805 configured to receive a second notification message transmitted by the base station, where the second notification message includes information about whether a neighboring cell of a serving cell of the base station supports a first service.

In an optional embodiment, the system message includes a third field, and the third field includes a correspondence between a restricted access condition of a cell and a service requirement. Optionally, the correspondence between the restricted access condition of the cell and the service requirement is indicated in a form of joint coding, or the correspondence between the restricted access condition of the cell and the service requirement is indicated in a form of a bitmap. The terminal is able to identify a combination of different classes of services.

In an optional embodiment, the system message includes a fourth field, and the fourth field includes a correspondence between a type of the cell and a restricted access condition of the cell. Optionally, the correspondence between the type of the cell and the restricted access condition of the cell is indicated in a form of joint coding, or the correspondence between the type of the cell and the restricted access condition of the cell is indicated in a form of a bitmap. The terminal can identify a combination of different classes of services.

The terminal provided in these embodiments can perform the method in the foregoing embodiments, and implementation principles and technical effects are similar, which are not described herein again in these embodiments.

Based on the same inventive concept, a base station is further provided according to an embodiment of the present disclosure. Principles for the base station to address issues are similar to those in the access control method in the embodiments of the present disclosure. Therefore, implementations of the base station may refer to the implementations of the method, which are not repeated herein again.

Figure 9:
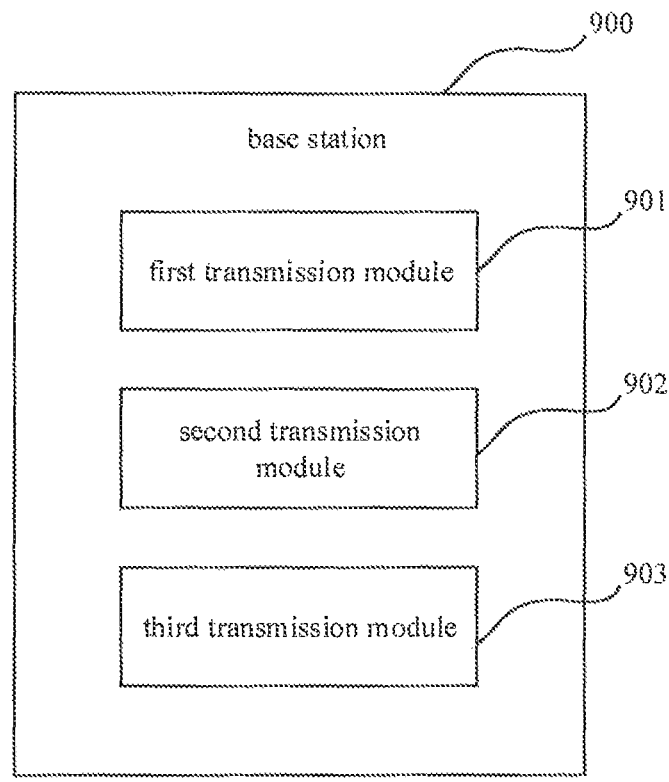
FIG. 9 is a schematic structural diagram of a base station according to an embodiment of the present disclosure.

Reference is made to FIG. 9, which shows a structure of a base station. The base station 900 includes: a first transmission module 901 configured to transmit a system message to a terminal, to enable the terminal to determine whether the terminal is permitted to camp on a cell of the base station according to the system message to obtain a determination result, and enable the terminal, according to the determination result, to camp on the cell of the base station or not to camp on the cell of the base station.

Optionally, the system message includes a first field. When the terminal is capable of identifying the first field, the determination result is permitting the terminal to perform a procedure of camping on the cell of the base station; and when the terminal is incapable of identifying the first field, the determination result is prohibiting the terminal to perform the procedure of camping on the cell of the base station.

Optionally, the system message includes an access class barring; when the terminal belongs to the access class barring, the determination result is prohibiting the terminal to perform a procedure of camping on the cell of the base station; and when the terminal does not belong to the access class barring, the determination result is permitting the terminal to perform the procedure of camping on the cell of the base station.

Optionally, the system message includes a PLMN identifier of a PLMN of a cell corresponding to a current core network of the base station; when the PLMN identifier of the PLMN that the terminal has registered includes the PLMN identifier of the PLMN of the cell corresponding to the current core network of the base station, the determination result is permitting the terminal to perform a procedure of camping on the cell of the base station; and when the PLMN identifier of the PLMN that the terminal has registered does not include the PLMN identifier of the PLMN of the cell corresponding to the current core network of the base station, the determination result is prohibiting the terminal to perform the procedure of camping on the cell of the base station.

Optionally, referring to FIG. 9 again, the base station 900 further includes: a second transmission module 902 configured to transmit a first notification message to the terminal, when the terminal fails to access a serving cell of the base station, and the first notification message carries at least one of information related to a redirected cell or information of a core network available to the terminal.

Optionally, the system message includes a core network type supported by a cell of the base station; when the terminal supports the core network type supported by the cell of the base station, the determination result is permitting the terminal to perform a procedure of camping on the cell of the base station; and when the terminal does not support the core network type supported by the cell of the base station, the determination result is prohibiting the terminal to perform the procedure of camping on the cell of the base station.

Optionally, the system message includes a second field; when a value of the second field in the system message is a first predetermined value, the determination result includes permitting the terminal to perform a procedure of camping on the cell of the base station; and when the value of the second field in the system message is a second predetermined value, the determination result includes prohibiting the terminal to perform the procedure of camping on the cell of the base station.

Optionally, referring again to FIG. 9, the base station 900 further includes: a third transmission module 903 configured to transmit a second notification message to the terminal, where the second notification message includes information about whether a neighboring cell of a serving cell of the base station supports a first service.

Optionally, the system message includes a third field, and the third field includes a correspondence between a restricted access condition of a cell and a service requirement.

Optionally, the system message includes a fourth field, and the fourth field includes a correspondence between a type of the cell and a restricted access condition of the cell.

The network device provided in these embodiments can perform the method in the foregoing embodiments, and implementation principles and technical effects are similar, which are not described herein again in these embodiments.

A hardware structure diagram of a terminal and a base station is also provided in the following embodiments.

Figure 10:
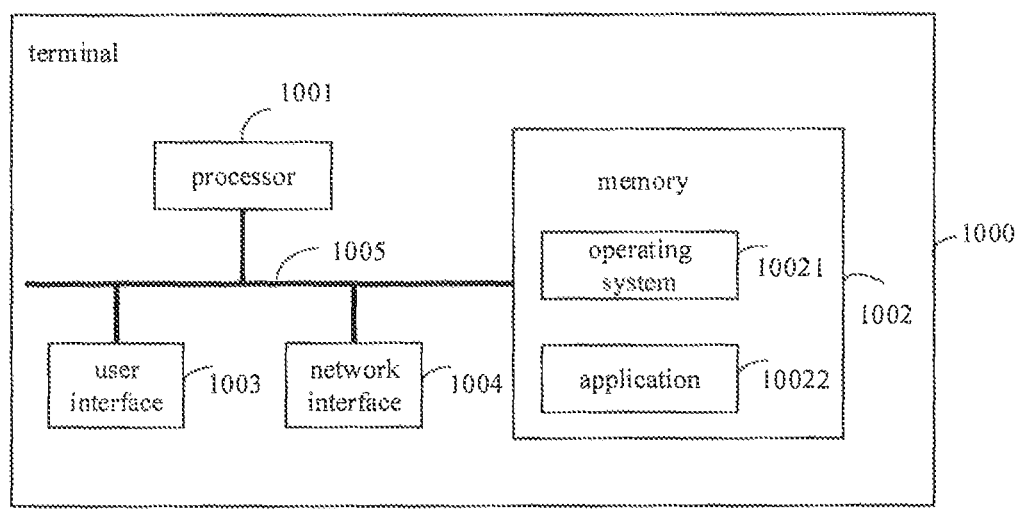
FIG. 10 is a schematic structural diagram of a terminal according to another embodiment of the present disclosure.

FIG. 10 is a schematic structural diagram of a terminal according to another embodiment of the present disclosure. As shown in FIG. 10, the terminal 1000 shown in FIG. 10 includes at least one processor 1001, a memory 1002, at least one network interface 1004, and a user interface 1003. Various components in terminal 1000 are coupled together by a bus system 1005. It may be appreciated that the bus system 1005 is configured to implement connections and communications between these components. The bus system 1005 includes a power bus, a control bus, and a status signal bus, in addition to the data bus. However, for clarity of description, various buses are labeled as the bus system 1005 in FIG. 10.

The user interface 1003 may include a display, a keyboard, or a pointing device (such as a mouse, a trackball, a touchpad, or a touch screen).

It may be appreciated that the memory 1002 in the embodiments of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 1002 of the system and method described herein is meant to include, without limitation, these and any other suitable types of memories.

In some implementations, the memory 1002 stores following elements: executable module or data structure, or a subset or extension set thereof, such as an operating system 10021 and an application 10022.

The operating system 10021 includes various system programs, such as a framework layer, a core library layer, a driver layer, to implement various fundamental services and process hardware-based tasks. The application 10022 includes various applications, such as media player and browser, to implement a variety of application services. The program implementing the method according to embodiments of the present disclosure may be included in the application 10022.

In the embodiments of the present disclosure, by invoking the program or the instruction stored in the memory 1002, specifically, the program or the instruction stored in the application 10022, the processor 1001 may execute the method applied to the terminal.

The method disclosed in the foregoing embodiments of the present disclosure may be applied to the processor 1001 or implemented by the processor 1001. The processor 1001 may be an integrated circuit with signal processing capability. During an implementation process, steps of the methods may be realized in form of hardware by integrated logical circuits in the processor 1001, or in form of software by instructions. The processor 1001 may be a general purpose processor, digital signal processor (DSP), application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 1002. The processor 1001 reads information from the memory 1002 and performs the steps of the methods with its hardware.

It may be appreciated that the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in the present disclosure or a combination thereof.

For software implementation, the technical solutions described in the embodiments of the present disclosure may be implemented by a module (e.g., process, function, etc.) configured to perform the function described in the embodiments of the present disclosure. Software codes may be stored in a memory and executed by the processor. The memory may be implemented inside or outside the processor.

Specifically, the processor 1001 may invoke a program or instruction stored in the memory 1002 to execute the method applied to the terminal in the foregoing method embodiments.

Figure 11:
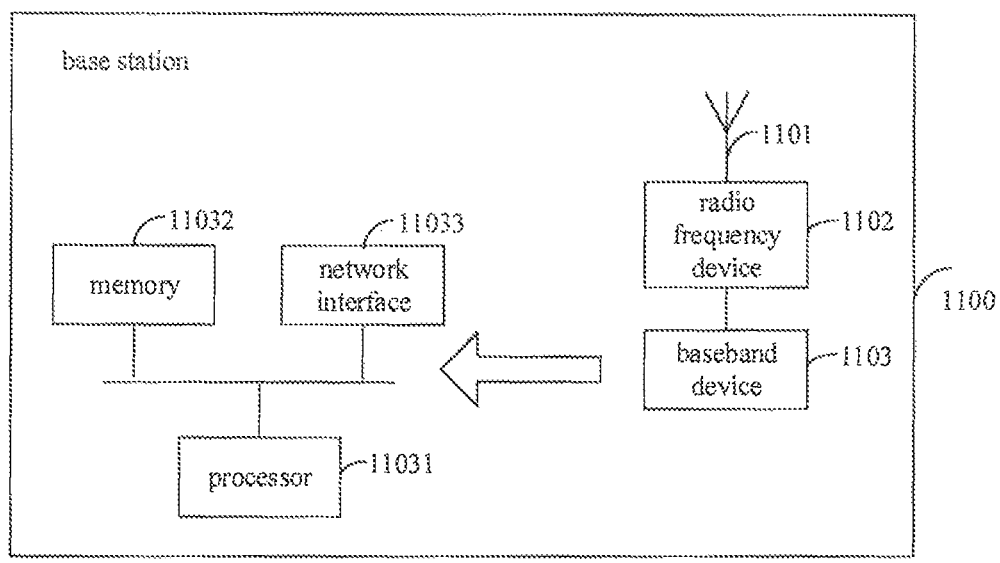
FIG. 11 is a schematic structural diagram of a base station according to another embodiment of the present disclosure.

FIG. 11 is a schematic structural diagram of a base station according to an embodiment of the present disclosure. As shown in FIG. 11, the base station 1100 includes an antenna 1101, a radio frequency device 1102, and a baseband device 1103. The antenna 1101 is connected to the radio frequency device 1102. In the uplink direction, the radio frequency device 1102 receives information through the antenna 1101, and transmits the received information to the baseband device 1103 for processing. In the downlink direction, the baseband device 1103 processes the information to be transmitted and transmits the processed information to the radio frequency device 1102. The radio frequency device 1102 processes the received information and transmits it through the antenna 1101.

The above-described frequency band processing module may be located in the baseband device 1103, and the method performed by the base station in the above embodiments may be implemented in the baseband device 1103, which includes a processor 11031 and a memory 11032.

The baseband device 1103 may include, for example, at least one baseband board, and the baseband board is provided with a plurality of chips. As shown in FIG. 11, one of the chips is, for example, a processor 11031, and is connected to the memory 11032 to call a program in the memory 11032 to execute operations at the base station side in the forgoing method embodiments.

The baseband device 1103 may further include a network interface 11033 configured to exchange information with the radio frequency device 1102, such as a common public radio interface (CPRI).

The processor herein may be a processor or a collective name of multiple processing elements. For example, the processor may be a CPU, an ASIC, or one or more integrated circuits configured to implement the above method performed by the base station, for example, one or more microprocessor DSPs, or one or more field programmable gate array FPGAs. The storage component may be a memory or a collective name of multiple storage components.

The memory 11032 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 11032 of the system and method described herein is meant to include, without limitation, these and any other suitable types of memories.

Specifically, the processor 11031 calls a program in the memory 11032 to execute the method performed by the base station in the above embodiments.

An embodiment of the present disclosure further provides a computer readable storage medium, having a data transfer program stored thereon, and the data transfer program is executed by a processor to implement steps of the access control methods as described above.

A person skilled in the art may be aware that the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing systems, apparatuses, and units, reference may be made to a corresponding processes in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store a program code, such as a universal serial bus (USB) flash drive, a mobile hard disk, an ROM, an RAM, a magnetic disk, or an optical disc.

The above descriptions are merely specific implementations of the present disclosure, but the scope of the present disclosure is not limited thereto. It should be noted that any modifications and substitutions easily thought by a person of ordinary skill in the art without departing from the technical scope of the present disclosure shall fall within the scope of the present disclosure. Therefore, the scope of protection of the present disclosure should be determined by the scope of the claims.

What is claimed is:

1. An access control method, performed by a terminal, comprising:
   receiving a system message transmitted by a base station;
   determining whether to camp on a cell of the base station according to the system message to obtain a determination result; and
   performing, according to the determination result, a procedure of camping on the cell of the base station or a procedure of not camping on the cell of the base station,
   wherein the system message comprises a public land mobile network (PLMN) identifier of a PLMN of a cell corresponding to a current core network of the base station, and the determining whether to camp on the cell of the base station according to the system message to obtain the determination result comprises:
   determining whether a PLMN identifier of a PLMN that the terminal has registered comprises the PLMN identifier of the PLMN of the cell corresponding to the current core network of the base station;
   obtaining the determination result of permitting performing the procedure of camping on the cell of the base station, when the PLMN identifier of the PLMN that the terminal has registered comprises the PLMN identifier of the PLMN of the cell corresponding to the current core network of the base station; and
   obtaining the determination result of prohibiting performing the procedure of camping on the cell of the base station, when the PLMN identifier of the PLMN that the terminal has registered does not comprise the PLMN identifier of the PLMN of the cell corresponding to the current core network of the base station, or, wherein the system message comprises a core network type supported by a serving cell of the base station, and the determining whether to camp on the cell of the base station according to the system message to obtain the determination result comprises:

determining whether the terminal supports the core network type supported by the cell of the base station;

obtaining the determination result of permitting performing the procedure of camping on the cell of the base station, when the terminal supports the core network type supported by the cell of the base station; and obtaining the determination result of prohibiting performing the procedure of camping on the cell of the base station, when the terminal does not support the core network type supported by the cell of the base station.

2. The method according to claim 1, wherein when the terminal fails to access a serving cell of the base station, the method further comprises:

receiving a first notification message transmitted by the base station, wherein the first notification message carries information related to a redirected cell.

3. The method according to claim 1, further comprising:

receiving a second notification message transmitted by the base station, wherein the second notification message comprises information about whether a neighboring cell of a serving cell of the base station supports a first service.

4. A non-transitory computer readable storage medium, wherein the computer readable storage medium stores a data transfer program, and the data transfer program is executed by a processor to implement steps in the access control method according to claim 1.

5. The non-transitory computer readable storage medium according to claim 4, wherein the data transfer program is executed by the processor to implement following steps:

when the terminal fails to access a serving cell of the base station, receiving a first notification message transmitted by the base station, wherein the first notification message carries information related to a redirected cell.

6. The non-transitory computer readable storage medium according to claim 4, wherein the data transfer program is executed by the processor to further implement following steps:

receiving a second notification message transmitted by the base station, wherein the second notification message comprises information about whether a neighboring cell of a serving cell of the base station supports a first service.

7. A terminal, comprising: a memory, a processor, and a computer program stored on the memory and executable on the processor, wherein when executing the program, the processor is configured to:

receive a system message transmitted by a base station;

determine whether to camp on a cell of the base station according to the system message to obtain a determination result; and perform, according to the determination result, a procedure of camping on the cell of the base station or a procedure of not camping on the cell of the base station, wherein the system message comprises a public land mobile network (PLMN) identifier of a PLMN of a cell corresponding to a current core network of the base station, and the processor is configured to:

determine whether a PLMN identifier of a PLMN that the terminal has registered comprises the PLMN identifier of the PLMN of the cell corresponding to the current core network of the base station;

obtain the determination result of permitting performing the procedure of camping on the cell of the base station, when the PLMN identifier of the PLMN that the terminal has registered comprises the PLMN identifier of the PLMN of the cell corresponding to the current core network of the base station; or obtain the determination result of prohibiting performing the procedure of camping on the cell of the base station, when the PLMN identifier of the PLMN that the terminal has registered does not comprise the PLMN identifier of the PLMN of the cell corresponding to the current core network of the base station, or, wherein the system message comprises a core network type supported by a serving cell of the base station, and the processor is configured to:

determine whether the terminal supports the core network type supported by the cell of the base station;

obtain the determination result of permitting performing a procedure of camping on the cell of the base station, when the terminal supports the core network type supported by the cell of the base station; or obtain the determination result of prohibiting performing the procedure of camping on the cell of the base station, when the terminal does not support the core network type supported by the cell of the base station.

8. The terminal according to claim 7, wherein the processor is further configured to receive a first notification message transmitted by the base station when the terminal fails to access a serving cell of the base station, wherein the first notification message carries information related to a redirected cell.

9. The terminal according to claim 7, wherein the processor is further configured to receive a second notification message transmitted by the base station, wherein the second notification message comprises information about whether a neighboring cell of a serving cell of the base station supports a first service.

* * * * *